US010217225B2

(12) United States Patent
Aravkin et al.

(10) Patent No.: US 10,217,225 B2
(45) Date of Patent: Feb. 26, 2019

(54) DISTRIBUTED PROCESSING FOR PRODUCING THREE-DIMENSIONAL RECONSTRUCTIONS

(71) Applicant: International Business Machines Corporation, Armonk, NY (US)

(72) Inventors: Aleksandr Y. Aravkin, Seattle, WA (US); Chung-Ching Lin, White Plains, NY (US); Karthikeyan N. Ramamurthy, Ossining, NY (US); Sharathchandra U. Pankanti, Darien, CT (US); Raphael Viguier, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 15/170,522

(22) Filed: Jun. 1, 2016

(65) Prior Publication Data
US 2017/0352159 A1    Dec. 7, 2017

(51) Int. Cl.
*G06T 7/20* (2017.01)
*G06T 7/50* (2017.01)
(Continued)

(52) U.S. Cl.
CPC .............. *G06T 7/20* (2013.01); *B64C 39/024* (2013.01); *G06T 7/50* (2017.01); *G06T 17/00* (2013.01);
(Continued)

(58) Field of Classification Search
None
See application file for complete search history.

(56) References Cited

U.S. PATENT DOCUMENTS 8,837,811 B2    9/2014 Sinha et al.
2009/0010507 A1*  1/2009 Geng ...................... G06T 7/593
                                                  382/128
(Continued)

OTHER PUBLICATIONS

Tron et al. Distributed Pose Averaging in Camera Networks Via Consensus on SE(3) 2008, IEEE. (Year: 2008).*

(Continued)

*Primary Examiner* — Aaron M Richer
*Assistant Examiner* — Khoa Vu
(74) *Attorney, Agent, or Firm* — Rahan Uddin; Ryan, Mason & Lewis, LLP

(57) ABSTRACT

A method includes obtaining two-dimensional measurements of a given scene from sensors, the given scene comprising a plurality of scene points, distributing the given scene into bundles each associated with at least one sensor and at least one scene point, establishing constraints associated with the sensors and the plurality of scene points that are associated with two different bundles, estimating, individually for each of the bundles, a set of parameters for the at least one sensor and the at least one scene point associated with that bundle utilizing at least one of the two-dimensional measurements, generating a consensus parameter set for the one or more sensors and the plurality of scene points based on the estimated parameter sets, the established constraints being utilized to reconcile differences in parameter values in the estimated parameter sets, and producing a three-dimensional representation of the given scene utilizing the consensus parameter set.

20 Claims, 14 Drawing Sheets

(51) Int. Cl.
    *B64C 39/02*     (2006.01)
    *G06T 17/00*     (2006.01)
    *H04N 5/225*     (2006.01)

(52) U.S. Cl.
    CPC ....... *H04N 5/225* (2013.01); *B64C 2201/123* (2013.01); *G06T 2207/10016* (2013.01); *G06T 2207/10032* (2013.01)

(56) References Cited

U.S. PATENT DOCUMENTS

| | | | |
|---|---|---|---|
| 2011/0310255 A1* | 12/2011 | Medeiros | G06T 7/292 348/187 |
| 2013/0223673 A1* | 8/2013 | Davis | G06K 9/78 382/100 |
| 2013/0266179 A1* | 10/2013 | Jin | H04N 5/232 382/103 |
| 2013/0310093 A1* | 11/2013 | Giannakis | H04W 24/02 455/501 |
| 2013/0335528 A1 | 12/2013 | Vishwanath et al. | |
| 2014/0029824 A1 | 1/2014 | Shi et al. | |
| 2014/0043436 A1* | 2/2014 | Bell | H04N 13/0203 348/46 |
| 2014/0327792 A1* | 11/2014 | Mulloni | G06T 7/73 348/211.8 |
| 2015/0063687 A1 | 3/2015 | Nadar et al. | |
| 2015/0248584 A1* | 9/2015 | Greveson | G06K 9/00476 382/113 |
| 2015/0261184 A1 | 9/2015 | Mannion et al. | |
| 2015/0317802 A1 | 11/2015 | Jin | |
| 2015/0353205 A1 | 12/2015 | Nixon | |
| 2015/0371431 A1 | 12/2015 | Korb et al. | |
| 2016/0048945 A1 | 2/2016 | Chihara et al. | |
| 2016/0063309 A1 | 3/2016 | Konolige et al. | |
| 2016/0315807 A1* | 10/2016 | Peng | H04L 12/10 |
| 2017/0039765 A1* | 2/2017 | Zhou | G06T 19/006 |
| 2017/0124712 A1* | 5/2017 | Liu | G06T 7/73 |

OTHER PUBLICATIONS

Kai Ni et al. "Out-of-Core Bunbdle Adjustment for Large-Scale 3D Reconstruction" 2007, IEEE. (Year: 2007).*
A. Del Bue et al., "Bilinear Modeling via Augmented Lagrange Multipliers (BALM)," IEEE Transactions on Pattern Analysis and Machine Intelligence, Aug. 2012, pp. 1496-1506, vol. 34, No. 8.
S. Dhou et al., "Dynamic 3D Surface Reconstruction and Motion Modeling from a Pan-Tilt-Zoom Camera," Computers in Industry, Jun. 2015, pp. 183-193, vol. 70, No. C.
R. Gong et al., "Quadratic Surface Reconstruction from Multiple Views Using SQP," IEICE Transactions on Information Systems, Jan. 2004, pp. 215-223, vol. E67D, No. 1.
A. Irschara et al., "Large-Scale, Dense City Reconstruction from User-Contributed Photos," Computer Vision and Image Understanding, Jan. 2012, pp. 2-15, vol. 116, No. 1.
F. Mai et al., "Three-Dimensional Curve Reconstruction from Multiple Images," IET Computer Vision, Jul. 2012, pp. 273-284, vol. 6, No. 4.
F. Mai et al., "Augmented Lagrangian Approach for Projective Reconstruction from Multiple Views," 18th International Conference on Pattern Recognition (ICPR), Aug. 2006, pp. 634-637, vol. 1.
E. Mouragnon et al., "Generic and Real Time Structure from Motion Using Local Bundle Adjustment," Image and Vision Computing, Jul. 2009, pp. 1178-1193, vol. 27, No. 8.
S. Recker et al., "Depth Data Assisted Structure-from-Motion Parameter Optimization and Feature Track Correction," IEEE Applied Imagery Pattern Recognition Workshop (AIPR), Oct. 2014, 9 pages.
Y. Wang et al., "Robust Locally Linear Analysis with Applications to Image Denoising and Blind Inpainting," Society for Industrial and Applied Mathematics (SIAM) Journal on Imaging Sciences, Mar. 2013, pp. 526-562, vol. 6, No. 1.
H. Pan et al., "Dense 3D Reconstruction Combining Depth and RGB Information," Neurocomputing, Jan. 2016, pp. 644-651, vol. 175, No. PA.
J. Maurer et al., "Tapping into the Hexagon Spy Imagery Database: A New Automated Pipeline for Geomorphic Change Detection," ISPRS Journal of Photogrammetry and Remote Sensing, Oct. 2015, pp. 113-127, vol. 108.
X. Gao et al., "Local Self-Similarity Descriptor for Point-of-Interest Reconstruction of Real-World Scenes," Measurement Science and Technology, Jul. 2015, vol. 26, No. 8.
Y. Shi et al., "Fusion of a Panoramic Camera and 2D Laser Scanner Data for Constrained Bundle Adjustment in GPS-Denied Environments," Image and Vision Computing, Aug. 2015, pp. 28-37, vol. 40, No. C.
S.T. Thiele et al., "Insights into the Mechanics of En-Echelon Sigmoidal Vein Formation Using Ultra-High Resolution Photogrammetry and Computed Tomography," Journal of Structural Geology, Aug. 2015, pp. 27-44, vol. 77.
Y. Luo et al., "Fast Terrain Mapping from Low Altitude Digital Imagery," Neurocomputing, May 2015, pp. 105-116, vol. 156, No. C.
R.-G. Mihalyi et al., "Robust 3D Object Modeling with a Low-Cost RGBD-Sensor and AR-Markers for Applications with Untrained End-Users," Robotics and Autonomous Systems, Apr. 2016, pp. 1-17, vol. 66, No. C.
N. Bayramoglu et al., "Comparison of 3D Local and Global Descriptors for Similarity Retrieval of Range Data," Neurocomputing, Apr. 2016, pp. 13-27, vol. 184, No. C.
A. Fusiello et al., "Solving Bundle Block Adjustment by Generalized Anisotropic Procrustes Analysis," ISPRS Journal of Photogrammetry and Remote Sensing, Apr. 2015, pp. 209-221, vol. 102.
M. Babaee et al., "3-D Object Modeling from 2-D Occluding Countour Correspondences by Opti-Acoustic Stereo Imaging," Computer Vision and Image Understanding, Mar. 2015, pp. 56-74, vol. 132, No. C.
A. Eltner et al., "Analysis of Different Methods for 3D Reconstruction of Natural Surfaces from Parallel-Axes UAV Images," The Photogrammetric Record, Sep. 2015, pp. 279-299, vol. 30, No. 51.

* cited by examiner

*FIG. 10*
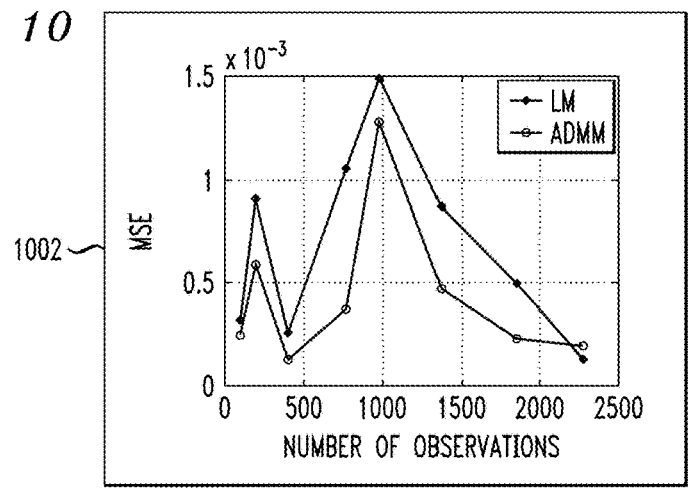
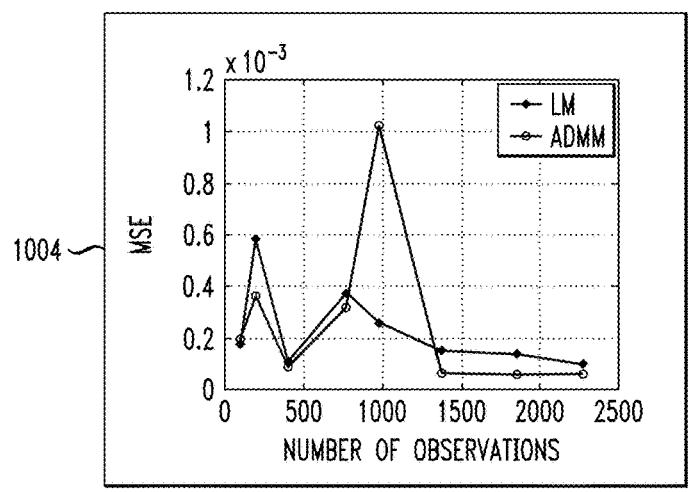
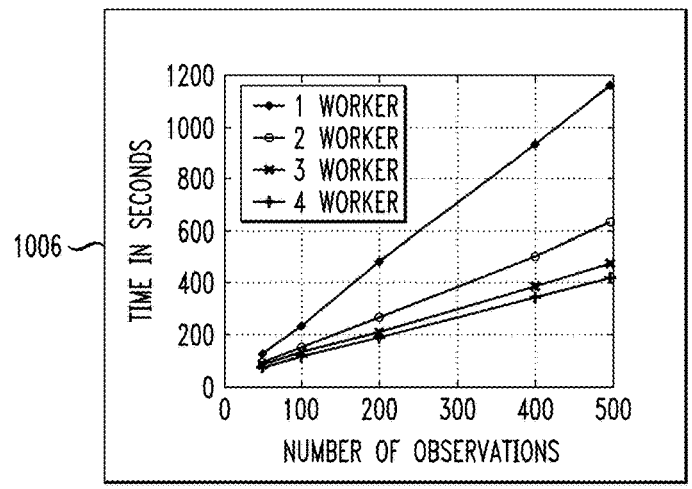

FIG. 11
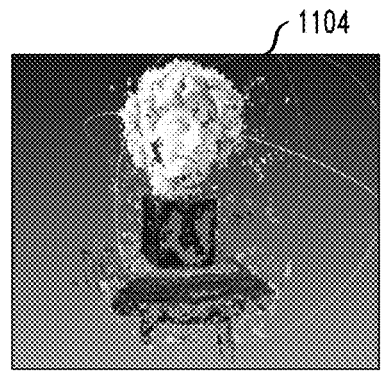
1104
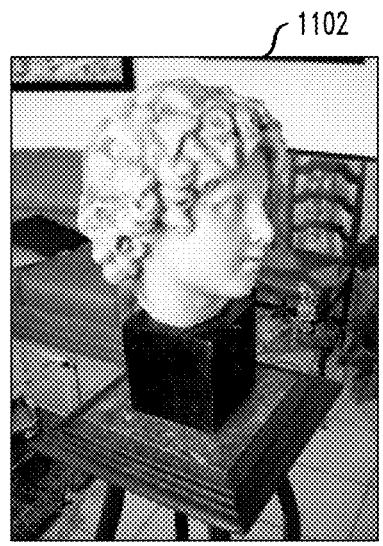
1102
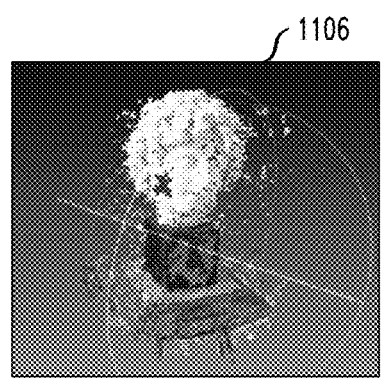
1106
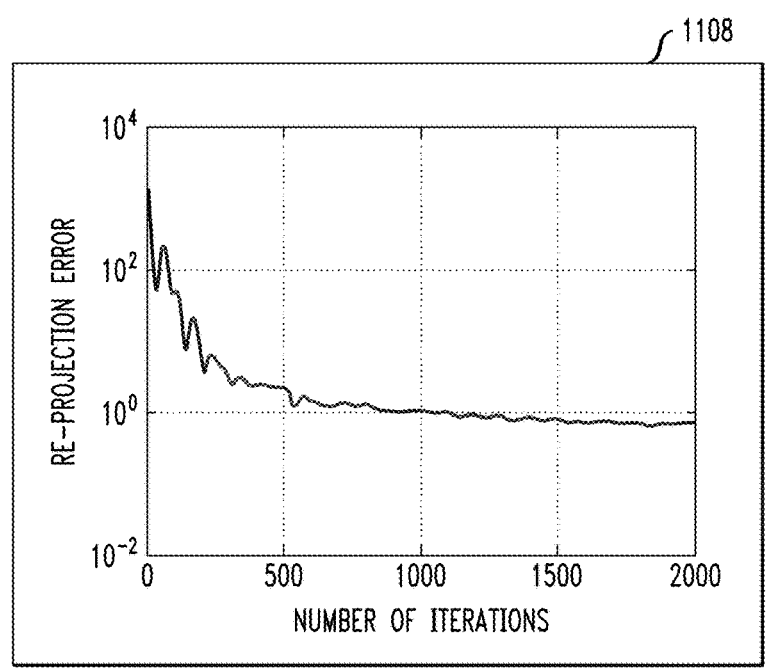
1108

DISTRIBUTED PROCESSING FOR PRODUCING THREE-DIMENSIONAL RECONSTRUCTIONS

STATEMENT REGARDING FEDERALLY SPONSORED RESEARCH OR DEVELOPMENT

This invention was made with Government support under Contract No.: HR0011-13-C-0022 awarded by Defense Advanced Research Projects Agency (DARPA). The Government has certain rights in this invention.

BACKGROUND

The present application relates to image processing, and more specifically, to reconstruction of scene and camera parameters from image data. Estimating the accurate positions of cameras and locations of three-dimensional (3D) scene points from a collection of images obtained by cameras is a classic problem in computer vision, referred to as structure from motion (SfM). The problem of optimizing for the camera parameters and scene points using the corresponding points in images is an important component of SfM and is also referred to as Bundle Adjustment (BA).

SUMMARY

Embodiments of the invention provide techniques for producing three-dimensional reconstructions.

For example, in one embodiment, a method comprises obtaining two or more two-dimensional measurements of a given scene from one or more sensors, the given scene comprising a plurality of scene points, distributing the given scene into two or more bundles, each bundle being associated with at least one sensor and at least one scene point, establishing constraints associated with one or more of the sensors and the plurality of scene points that are associated with two different bundles, estimating, individually for each of the bundles, a set of parameters for the at least one sensor and the at least one scene point associated with that bundle utilizing at least one of the two-dimensional measurements, generating a consensus parameter set for the one or more sensors and the plurality of scene points based on the estimated parameter sets, the established constraints being utilized to reconcile differences in parameter values in the estimated parameter sets for respective ones of the one or more sensors and the plurality of scene points, and producing a three-dimensional representation of the given scene utilizing the consensus parameter set wherein the method is performed by at least one processing device comprising a processor coupled to a memory.

BRIEF DESCRIPTION OF THE DRAWINGS

FIG. 10 shows plots comparing the error for camera parameters and scene points for different approaches, as well as runtime of reconstruction processing with increasing processing cores, according to an embodiment of the present invention.

FIG. 11 shows a two-dimensional image and two three-dimensional reconstructions of the two-dimensional image as well as the convergence of re-projection error for one of the three-dimensional reconstructions, according to an embodiment of the present invention.

DETAILED DESCRIPTION

Illustrative embodiments of the invention may be described herein in the context of illustrative methods, systems and devices for three-dimensional reconstructions. However, it is to be understood that embodiments of the invention are not limited to the illustrative methods, systems and devices but instead are more broadly applicable to other suitable methods, systems and devices.

Figure 1:
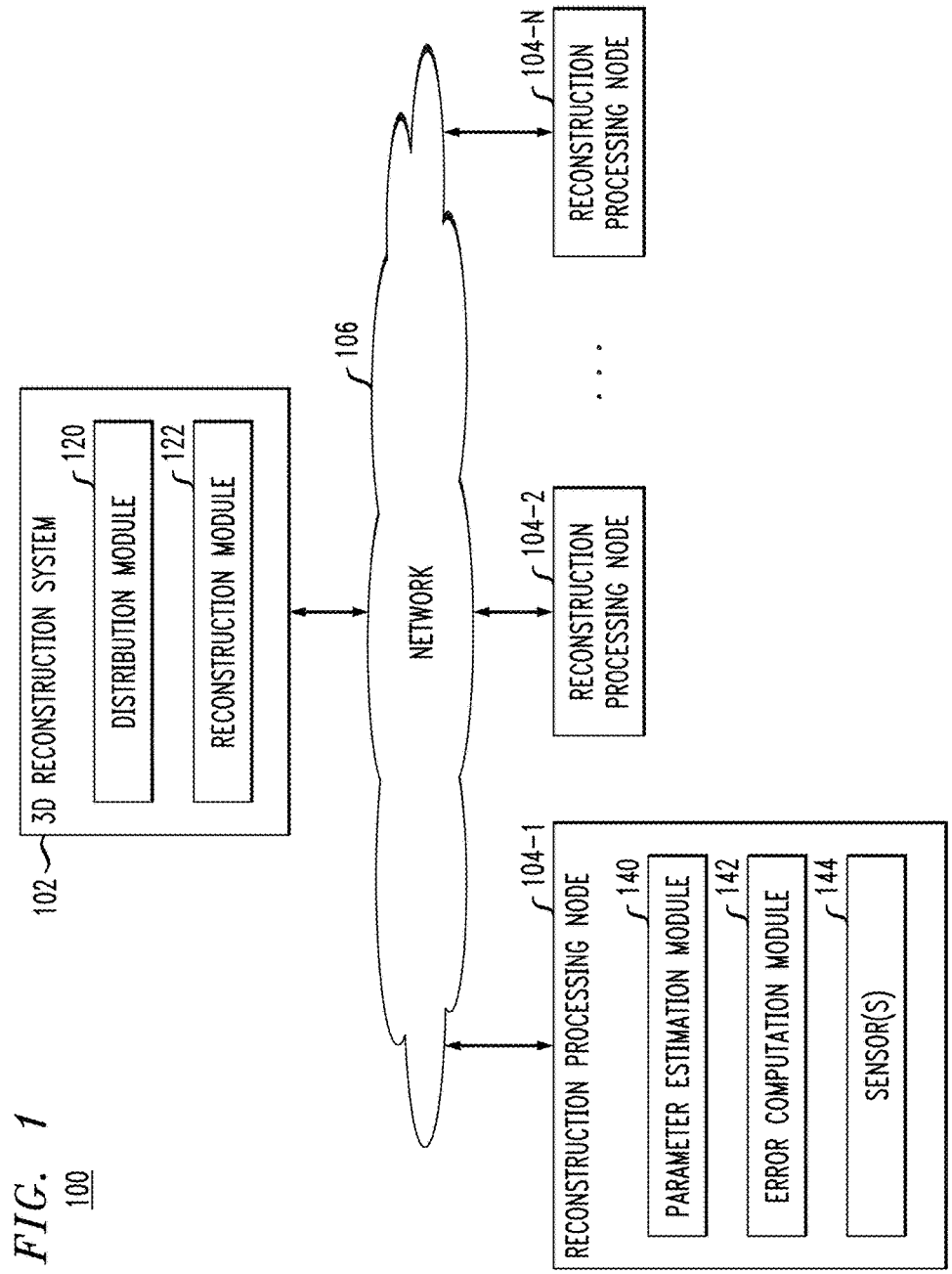
FIG. 1 depicts a system for producing three-dimensional reconstructions, according to an embodiment of the present invention.

FIG. 1 shows a system 100 for producing 3D reconstructions. The system 100 includes a 3D reconstruction system 102 and reconstruction processing nodes 104-1, 104-2, . . . , 104-N, collectively referred to herein as reconstruction processing nodes 104. The 3D reconstruction system 102 and reconstruction processing nodes 104 are connected via network 106.

3D reconstruction system 102 includes a distribution module 120 and reconstruction module 122. The distribution module 120 may be configured to distribute a data set, such as 2D images, amongst the reconstruction processing nodes 104. The reconstruction module 122 may collect parameter sets estimated by respective ones of the reconstruction processing nodes 104, and utilize the parameter sets to produce a 3D reconstruction.

While FIG. 1 shows the 3D reconstruction system 102 as distinct from the reconstruction processing nodes 104, embodiments are not limited to this arrangement. In some embodiments, the 3D reconstruction system 102 may itself be one of the reconstruction processing nodes 104. Functionality described with respect to the distribution module 120 and reconstruction module 122 may therefore be implemented in some embodiments via one or more of the reconstruction processing nodes 104.

In addition, while FIG. 1 shows an arrangement wherein the 3D reconstruction system 102 is connected to the reconstruction processing nodes 104 via network 106, embodiments are not limited to this arrangement. In some cases, the 3D reconstruction system 102 and reconstruction processing nodes 104 may be part of the same computing node, system or server. As one example, the 3D reconstruction system 102 and reconstruction processing nodes 104 may be implemented by distinct processors, processor cores, processor threads, etc. in the same computing system. Reconstruction processing nodes 104 may be implemented via a graphics processing unit (GPU) in a computing system while the 3D reconstruction system 102 may be implemented via a central processing unit (CPU) of the same computing system, or vice versa. Various other arrangements are possible, including arrangements in which reconstruction processing nodes 104 are implemented by specialized hardware such as application-specific integrated circuits (ASICs) or field-programmable gate arrays (FPGAs).

Reconstruction processing node 104-1 includes parameter estimation module 140, error computation module 142 and sensors 144. Although not explicitly shown in FIG. 1, other ones of the reconstruction processing nodes 104 may also include parameter estimation modules, error computation modules and sensors. The parameter estimation module 140 is configured to estimate a set of parameters for a bundle associated with at least one sensor and at least one scene point. The error computation module 142 is used to estimate errors in the parameter set, possibly via an iterative process so as to reach consensus with other ones of the reconstruction processing nodes 104.

The reconstruction processing node 104-1 is shown in FIG. 1 as including one or more sensors 144. The sensors 144 may include image or camera sensors. In some embodiments, each camera that captures a 2D image of a scene may individually estimate parameters sets for a 3D reconstruction. Reconstruction processing nodes 104, however, need not comprise or be associated with the camera or other sensor that captures a 2D representation of a scene.

Figure 2:
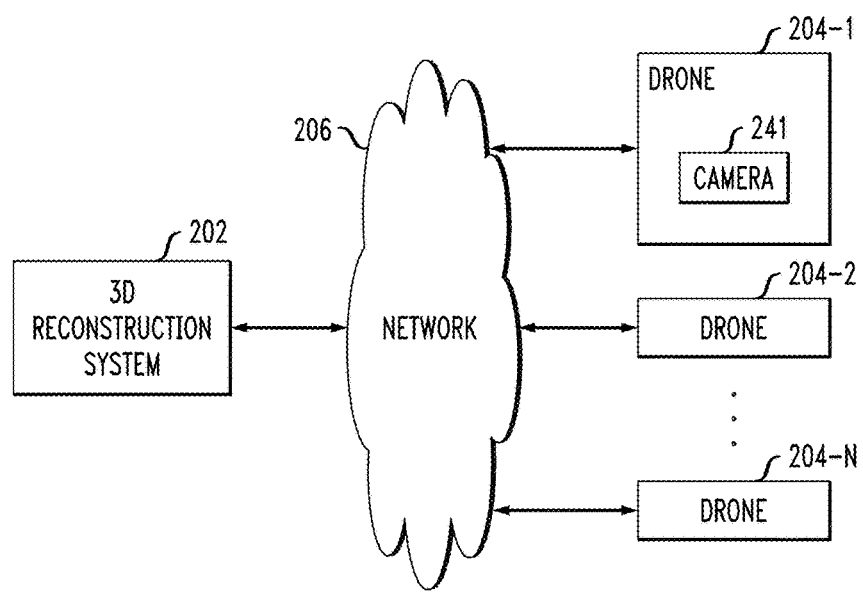
FIG. 2 depicts another system for producing three-dimensional reconstructions, according to an embodiment of the present invention.

FIG. 2 depicts another system 200 for producing 3D reconstructions. The system 200 includes a 3D reconstruction system 202 and drones 204-1, 204-2, . . . 204-N, collectively referred to herein as drones 204. The 3D reconstruction system 202 and drones 204 are connected via network 206. Drone 204-1 is shown including camera 241. Although not specifically shown in FIG. 2, other ones of the drones 204 may also include cameras or other image sensors.

The system 200 may be viewed as an implementation of system 100 wherein the reconstruction processing nodes 104 are the drones 204. Drones are emerging as a de facto measurement medium in a variety of industries. For example, drones such as drones 204 may be used in agriculture. The drones 204 may fly over and take 2D images of fields. The 2D images from the drones 204 may be processed by 3D reconstruction system 202 so as to generate 3D reconstructions of the fields. The 3D reconstructions can be used for a variety of tasks, including by way of example measuring plant growth. Drones such as drones 204 may also be used in the oil and gas industries. Drones may fly over and take 2D images of ditches or other geographical features. 3D reconstructions of such geographical features produced by the 3D reconstruction system 202 can be used for a variety of tasks, including by way of example measuring the volume of the geographical features. Drones such as drones 204 may be used in the transportation industry, such as for rail and roadway inspections, aircraft inspections, etc., in military or intelligence gathering situations, and various other use scenarios.

Some commercial offerings use centralized methods for producing 3D reconstructions, which are not scalable and cannot produce results in real-time. Embodiments use distributed processing for 3D reconstructions, and can thus provide for generating 3D reconstruction in real time, such as for use in situations with body worn cameras or swarms, for dense reconstruction, for object tracking and recognition and determining object attributes, etc.

Figure 3:
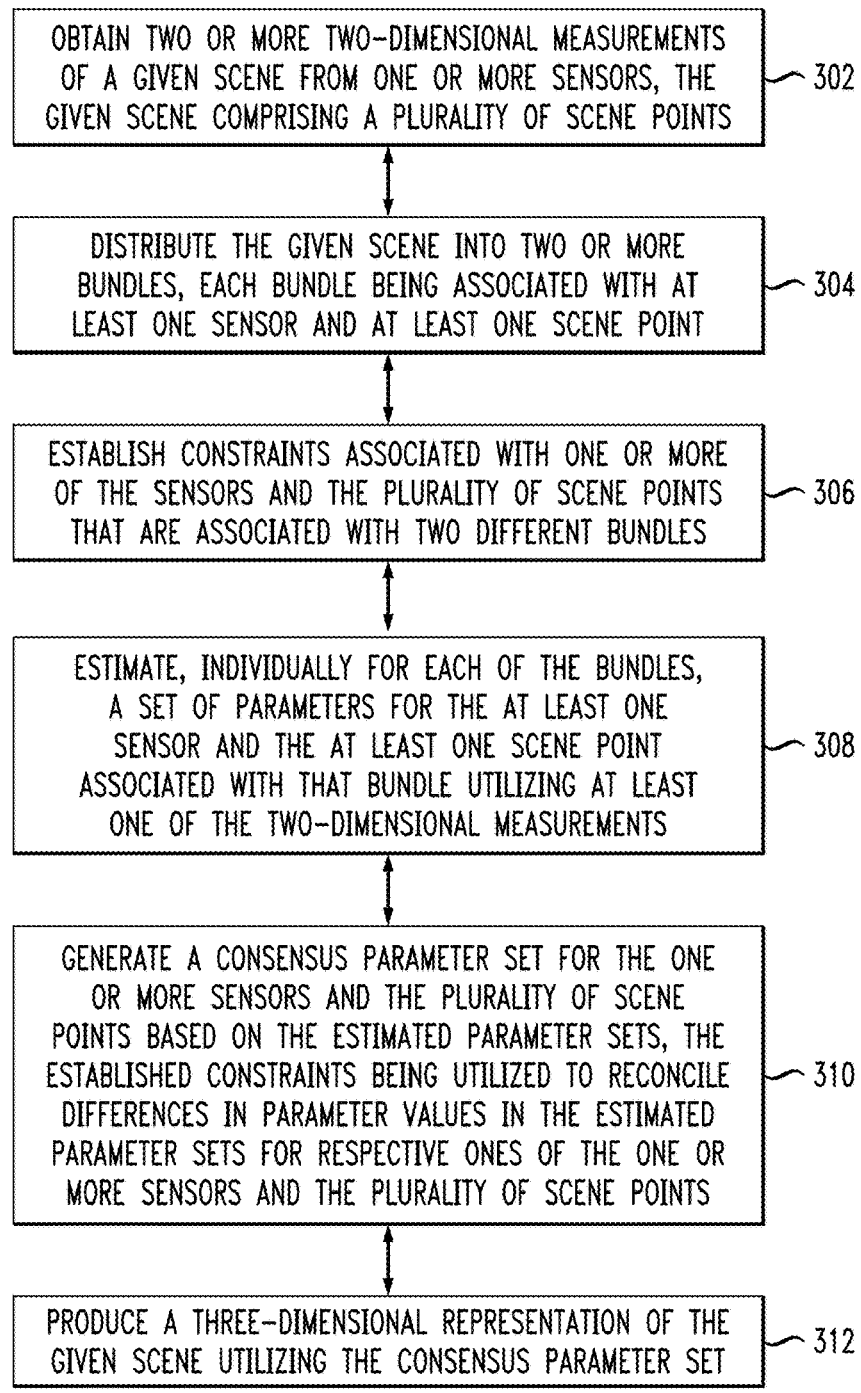
FIG. 3 depicts a process for producing three-dimensional reconstructions, according to an embodiment of the present invention.

FIG. 3 shows a process 300 for producing 3D reconstructions. The process 300 may be performed by the 3D reconstruction system 102 and reconstruction processing nodes 104 in system 100, or by the 3D reconstruction system 202 and drones 204 in system 200. The process 300 beings with step 302, obtaining two or more 2D measurements of a given scene from one or more sensors, the given scene comprising a plurality of scene points. The sensors may be image capture devices, such as cameras. In some embodiments at least two of the 2D measurements of the given scene are obtained from a single sensor. In other embodiments at least a first one of the 2D measurements of the given scene is obtained from a first sensor and at least a second one of the 2D measurements of the given scene is obtained from a second sensor different than the first sensor.

In some embodiments, the sensors may be drones as in system 200. One or more of the drones 204 may take multiple images of a scene as the drones 204 move through or around a particular area. A single one of the drones 204 may fly over or around a scene and take multiple images of that scene, or multiple ones of the drones 204 may fly over the same scene and each of the drones 204 may take one or more multiple images of that scene.

In other embodiments, the sensors may be stationary, such as cameras positioned at various locations. The cameras may take images of the same scene, either periodically or on request. For example, a building may have multiple security cameras which capture different perspectives or portions of a particular scene. In still other embodiments, an object of interest may be moved or rotated such that a stationary camera or image capture device can take obtain multiple 2D representations of the object of interest.

In step 304, the given scene is distributed into two or more bundles, with each bundle being associated with at least one sensor and at least one scene point. Step 304 may involve one or more of: distributing a given scene point such that the given scene point is associated with a first bundle and at least a second bundle; distributing a given sensor such that the given sensor is associated with a first bundle and at least a second bundle; distributing the plurality of scene points such each of the bundles is associated with a single one of the plurality of scene points; distributing the one or more sensors such that each of the bundles is associated with a single one of the one or more sensors; and distributing the one or more sensors and the plurality of scene points such that each bundle is associated with a single one of the one or more sensors and a single one of the plurality of scene points.

The process 300 continues with step 306, establishing constraints associated with one or more of the sensors and the plurality of scene points that are associated with two different bundles. Step 306 may involve setting a constraint such that, for any scene point associated with at least two different bundles, the parameter values for that scene point are substantially the same for the different bundles. Step 306 may also or alternatively involve setting a constraint such that, for any sensor associated with at least two different bundles, the parameter values for that sensor are substantially the same for the different bundles.

Step 308 includes estimating, individually for each of the bundles, a set of parameters for the at least one sensor and the at least one scene point associated with that bundle utilizing at least one of the two-dimensional measurements. In some embodiments, step 308 includes utilizing an alternating direction method of multipliers (ADMM) algorithm. The parameters of a given sensor may include, by way of example, a three-dimensional position, roll, pitch and yaw angles, a principal point, focal length, focal length ratios and axis skew. The parameters of a given scene point may include a three-dimensional position. In some embodiments, step 308 includes providing the two or more bundles to two or more processing nodes, such as the reconstruction processing nodes 104 in system 100, and receiving the estimated parameter sets from the two or more processing nodes.

The process continues with step 310, generating a consensus parameter set for the one or more sensors and the plurality of scene points based on the estimated parameter sets, the established constraints being utilized to reconcile differences in parameter values in the estimated parameter sets for respective ones of the one or more sensors and the plurality of scene points. The process 300 concludes with producing a 3D representation of the given scene utilizing the consensus parameter set in step 312.

Figure 4:
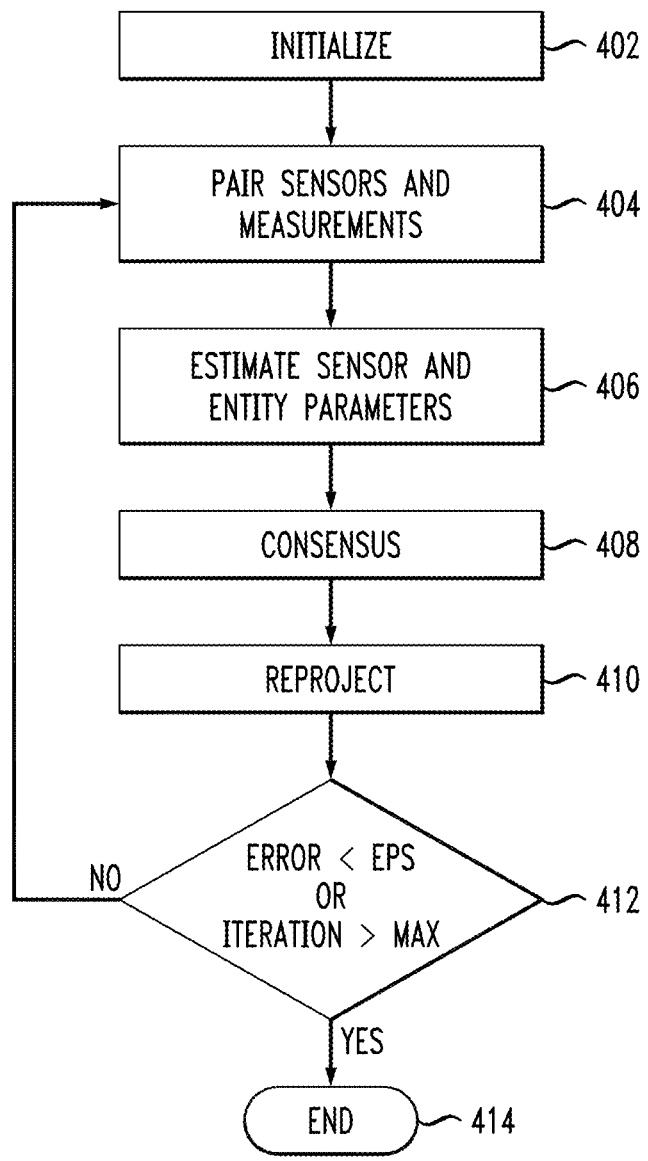
FIG. 4 depicts another process for producing three-dimensional reconstructions, according to an embodiment of the present invention.

FIG. 4 shows another process 400 for producing 3D reconstructions. In step 402, initialization is performed. Initialization includes assuming initial estimates from entities and sensors. Sensors and measurements are paired in step 404, and sensor and entity parameters are estimated in step 406. Steps 404 and 406 consider the pairs of measurements and sensors in isolation from one another to independently refine entity and sensor parameters from considered paired sensors and measurements. Step 408 includes generating a consensus by reconciling the independent estimates of entities and sensors, and then reprojection is performed in step 410 to generate a 3D reconstruction.

Steps 404 through 410 may be performed iteratively based on decision block 412, where the reconciled estimates from a previous iteration form the initial estimates for a subsequent iteration. The number of iterations is controlled by decision block 412, which may set a maximum number of iterations as well as a measure indicating the error between projected entity estimates and original measurements. Based on decision block 412, the process 400 loops back to step 404 or ends in step 414.

As mentioned above, SfM is a problem in computer vision and 3D reconstruction. BA, or optimizing for camera parameters and scene points using corresponding points from 2D images, is an important component of SfM. BA is subject to a number of performance and scalability issues. Approaches for BA can be broadly divided into three categories: (a) those that pose BA as non-linear least squares; (b) those that decouple the problem in each camera using a triangulation-resection procedure for estimation; and (c) those that pose and solve BA in a linear algebraic formulation. Some important considerations of these methods are reducing the computational complexity by exploiting the structure of the problem, incorporating robustness to outlier observations or correspondence mismatches, distributing the computations or making the algorithm incremental, and making the algorithm immune to initial conditions.

Embodiments provide techniques for distributing BA over camera and/or scene points using distributed alternating direction method of multipliers (D-ADMM). Most techniques for BA in computer vision are either centralized or operate incrementally. As such, these techniques lead to poor scaling which affects the quality of a solution as the number of images grows in large scale SfM. Embodiments which utilize a principled distribution algorithm for BA can overcome these and other disadvantages. In some embodiments, distributing the optimization of non-linear least square in BA using alternating direction method of multipliers (ADMM) is used. In a distributed setting, robust formulations are important even under standard error assumption because each processing node may see only a small portion of the data. Convergence, accuracy of parameter estimates and scalability of distributed implementations are described below in the context of synthetic 3D datasets with known camera position and orientation ground truth. As will be described in further detail below, embodiments can achieve good results and can scale linearly in runtime with the number of observed points.

Robust approaches for BA are typically used to protect world point and camera parameter estimates from effects of outliers. Outliers in BA may be incorrect point correspondences that have gone undetected in data cleaning. Robust formulations in some embodiments are used to accelerate consensus in distributed formulations. Depending on how distribution is achieved, each processing node performing computation may see only a small portion of the total data, and attempt to use it to infer its local parameters. Small sample means can be extreme, even when the original sample is well-behaved, i.e., even when re-projection errors are truly Gaussian. In a limiting case, each processing node may base its computations on one data point. In this case, from the point of view of the individual processing nodes, outliers are guaranteed to occur as an artifact of distributing the computation.

To deal with these issues, two natural approaches are: (a) robust error measures for re-projection error; and (b) robust consensus measures. While approach (b) may appear more natural since it does not change the original problem and focuses instead on the way updates from processing nodes are combined. However, outliers in the consensus process may correspond to processing nodes that maintain parameters values far away from those of the majority, and this may slow down convergence. On the other hand, strongly enforcing consensus and allowing each processing node to have large data residuals if their data are pushing away from the majority estimate would by definition mitigate the effects of small samples sizes due to distribution. Using robust losses during consensus allows parameter values to be spread away from the consensus estimate. Therefore, robust losses for re-projection errors and non-robust losses for enforcing consensus are ideal for good convergence in some embodiments.

Embodiments provide for robust, distributed approaches for BA that can be easily parallelized. In particular, embodiments may distribute the scene points, distribute the camera parameters, or distribute the world points and camera parameters together as will be discussed in further detail below. As mentioned above, embodiments may use algorithms based on D-ADMM, where the broad principle is to cycle through computing multiple estimates for the same parameter, updating the consensus estimate and Lagrangian parameter until convergence.

The time complexities for distributing world points and camera parameters together is $O(l)$ per round of parameter updates in a serial setting, where $l$ is the number of 2D observations. In a fully parallel setting, it is possible to bring the time complexities down to $O(l)$ per update round. Compare this with the time complexities of the traditional and sparse versions of BA which are $O((m+n)^3)$ and $O(m^3+$ mn) respectively, where m and n are the number of cameras and 3D scene points. Embodiments may use algorithms that implicitly exploit the sparseness of the camera network, since not all cameras observe all scene points, and it is straightforward to incorporate robustness when computing the individual and consensus estimates.

Described below is a discussion of camera imaging and some notation that will be used in the detailed description of some embodiments. Let us denote the m camera parameter vectors as $\{y_j\}_{j=1}^m$, the n 3D scene points as $\{x_i\}_{i=1}^n$, and the 2D image points as $\{z_{ij}\}$. Each 2D image point $z_{ij} \in \mathbb{R}^2$ is obtained by the transformation and projection of a 3D scene point $x_i \in \mathbb{R}^q$ by the camera $y_j \in \mathbb{R}^p$. This is represented by a non-linear camera transformation function camera transformation $f(x_i, y_j)$. Note that, in a usual scenario, the number of image points is much less than mn, since not all cameras are imaging all scene points.

The camera parameter vector $(y_j)$ can be seven-dimensional by considering the following parameters: position (3 parameters); roll, pitch and yaw angles; and focal length. In this case, the principal point, focal length ratios and other intrinsic parameters such as radial lens distortion and skew are computed using calibration and held fixed throughout the process. If principal point and the focal length ratios are also allowed to vary there can be 11 parameters that need to be determined. For clarity of illustration, much of the discussion below assumes that only six parameters (the position and roll, pitch and yaw angles) need to be estimated. The overall idea behind BA is to solve the inverse problem of estimating the camera parameters and the 3D world points from the observations $\{z_{ij}\}$.

The parameters of the camera are the focal length g, the rotation angles $\alpha$, $\beta$, $\gamma$ and the translation vector $t \in \mathbb{R}^3$. The diagonal focal length matrix is denoted as $K \in \mathbb{R}^{3 \times 3}$ with the first two diagonal elements to be the focal length and the last element being 1. The rotation matrix is represented as $R = R_3(\gamma) R_2(\beta) R_1(\alpha)$, where $\{\alpha, \beta, \gamma\}$ are the Euler angles and $R_1$, $R_2$, $R_3$ are the rotations along the three axes of $\mathbb{R}^3$. The camera transformation is thus given as $\tilde{z} = Rx + t$. The final 2D image point z is obtained by a perspective projection and its co-ordinates are given by $$z_1 = \frac{\tilde{z}_1}{\tilde{z}_3}, \, z_2 = \frac{\tilde{z}_2}{\tilde{z}_3}. \tag{1}$$

Given the 2D points in multiple images that represent the same scene point, BA may be carried out using a non-linear least squares minimization of the objective, $$\min_{\{x_i\},\{y_j\}} \sum_{j=1}^m \sum_{i \in S(j)} \|z_{i,j} - f(x_i, y_j)\|_2^2. \tag{2}$$

The set S(j) contains i if the scene point i is imaged by the camera j. The number of unknowns in the objective function of Equation (2) is 3n+6m, and hence it is necessary to have at least these many observations to obtain a good solution. In a normal scenario, this condition as met as the number of observations are much larger than this. The objective function of Equation (2) can be solved by iteratively linearizing $f(x+\delta x, y+\delta y) \approx f(x,y) + J(x)\delta x + J(y)\delta y$, where $J(x)$ and $J(y)$ are the Jacobian matrices, and solving a direction finding least squares subproblem with the same structure as Equation (2) for $(\delta x, \delta y)$. If adaptively weighted ridge regularization is used instead of a line search, the resulting method is the Levenberg-Marquardt (LM) algorithm.

BA with the LM algorithm incurs a complexity of $O((m+n)^3)$ for each iteration, and a space complexity of $O(mn(m+n))$. This is because it involves the inversion of an $O(m+n) \times O(m+n)$ matrix in each iteration. The matrix size can be millions×millions in large-scale 3D reconstructions, and thus BA with the LM algorithm is subject to issues relating to scalability. However, by exploiting the sparsity of this matrix and using a Schur complement approach, the time complexity per iteration can be reduced to $O(m^3 + mn)$ and the space complexity can be reduced to $O(mn)$. Further complexity reduction can be achieved by utilizing a secondary sparse structure. Conjugate gradient approaches for solving each iteration can reduce the time complexity to $O(m)$ per iteration, making it essentially linear in the number of cameras.

Another approach for reducing the computational complexity involves decoupling of the optimization by explicitly estimating the scene point using back-projection in an intersection step and estimating the camera parameters in a resection step. The resection step decouples into m independent problems, and hence the overall procedure has a cost of $O(m)$ per iteration. A similar approach, but with the minimization of $l_\infty$ norm of the re-projection error can be used, which may be more reliable and can degrade gracefully with noise compared to $l_2$ based BA algorithms.

Incremental approaches for BA may also be used, where a partial BA or a full BA is performed after adding each camera and associated scene points to the set of unknown parameters, again with a complexity of $O(m)$. A hierarchical approach can also be used to improve the computational efficiency of BA. Since matching corresponding points can result in gross outliers, Student's-t loss function may be used instead of $l_2$ loss thereby making the optimization robust to outliers. Further, the scene points and camera parameters are also constrained to be close to their previous estimates, again using a Student's-t loss, hence incorporating further robustness.

ADMM is a simple yet powerful procedure that is well-suited for distributed optimization. In order to understand D-ADMM, consider the minimization of the objective $h(x) := \sum_{i=1}^n h_i(x)$, which can be written in local variables with the appropriate equality constraint (consensus) as, $$\min_{\{x_i\}, u} \sum_{i=1}^n h_i(x_i) \tag{3}$$

$$\text{subj. to } x_i - u = 0, \, i \in \{1, \ldots, n\}. \tag{4}$$

The augmented Lagrangian can now be written as $$\bar{l}_\phi(x, u, r, \rho) := \sum_{i=1}^n h_i(x_i) + r_i^T(x_i - u) + \frac{\rho}{2}\phi(x_i, u), \tag{5}$$

where $\rho > 0$ is the penalty parameter, $r_i$ is the Lagrangian multiplier for the constraint, and $\phi(x_i, u)$ is the augmentation term that measures the distance between individual variables $x_i$ and the consensus variable u. The solution to this proceeds in three alternating steps to update $\{x_i\}$, u, and $\{r_i\}$. Typically $\phi(x_i, u)$ is chosen to the squared Euclidean distance in which case Equation (5) becomes the proximal Lagrangian.

In some embodiments, however, other robust distance or divergence measures can be used.

Though the problem in Equation (3) is nonconvex, optimal solutions to the primal problem and the dual induced by the general Lagrangian in Equation (5) can still be characterized as its saddle points under very mild conditions. Moreover, augmented Lagrangians can allow for an exact penalty representation, where for all ρ sufficiently large, the primal solutions coincide with $\inf_x l_\phi(x,u,r,\rho)$. Specifically, $\bar{r}$ supports an exact penalty representation if there exists $\bar{\rho}>0$ with $(\bar{r},\bar{\rho})$ solving the dual problem induced by $l_\phi$, $$\psi(r, \rho) = \min_{x,u} l_\phi(x, u, r, \rho). \qquad (6)$$

In some embodiments, the penalty parameter ρ is set to a large value as in the proximal augmentation, thereby simplifying the above analysis.

Figure 5:
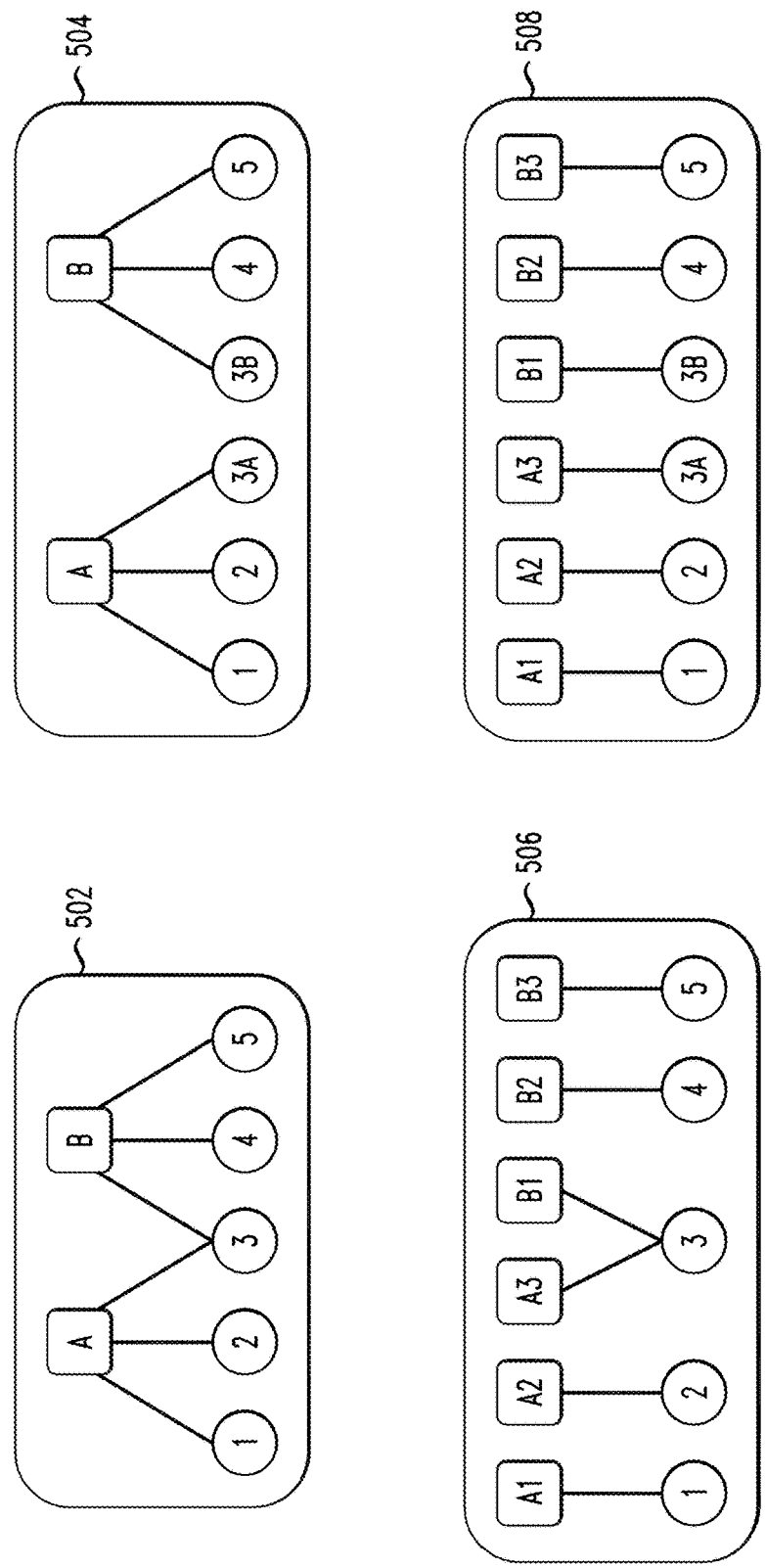
FIG. 5 depicts distributions of cameras and scene points, according to an embodiment of the present invention.

Optimizing Equation (2) in a distributed manner may be achieved using various techniques. FIG. 5 illustrates possible methods for distributing scene points and camera parameters. FIG. 5 shows an original configuration 502 of cameras A and B and scene points 1, 2, 3, 4 and 5. Configuration 504 shows a distribution of the scene points across cameras A and B, with the constraint that point 3A=3B. The configuration 504 may more generally be referred to as distributing scene points only. Configuration 506 distributes camera parameter estimations across scene points, with the constraints that A1=A2=A3 and B1=B2=B3. The configuration 506 may be referred to as distributing camera parameters only. Configuration 508 distributes both the camera parameter estimations and the scene point estimations, with the constraints that A1=A2=A3, B1=B2=B3, and 3A=3B. The configuration 508 may be referred to as distrusting both the scene points and the camera parameters. Formulations for the D-ADMM approach in the configurations 504, 506 and 508 are discussed in turn below.

First, we will discuss the formulations for configuration 504 or, more generally, the formulations for distributing scene points only. The basic idea behind the formulations below is to ignore the equivalence of scene points across multiple cameras in the objective and pose it as a constraint instead. Therefore, Equation (2) may be re-posed as $$\min_{\{x_i^j\},\{x_i\},\{y_j\}} \sum_{j=1}^m \sum_{i \in S(j)} \phi_m(z_{i,j} - f(x_i^j, y_j)) \text{ such that } x_i^j = x_i, \qquad (7)$$

$$\forall \, i, \text{ and } \{j:i \in S(j)\},$$

where $\phi_m$ denotes the misfit loss function used to measure the re-projection error, and the set S(j) contains i if the scene point i is imaged by the camera j. The augmented Lagrangian in this case, where $r_i^j$ is the Lagrange multiplier, is $$\sum_{j=1}^m \sum_{i \in S(j)} \phi_m(z_{i,j} - f(x_i^j, y_j)) + r_i^{jT}(x_i^j - x_i) + (\rho/2)\phi_a(x_i^j - x_i). \qquad (8)$$

Here, $\phi_a$ is the augmentation term that measures the distance between the distributed world or scene points and their consensus estimates. For both $\phi_m$ and $\phi_a$, we will consider the use of both squared Euclidean and Huber losses. The merits and demerits of these loss functions will be described in further detail below.

The Equation (8) may be minimized in an iterative manner using ADMM as follows:

$$\{x_i^{j(k+1)}\} := \underset{\{x_i^j\}}{\operatorname{argmin}} \sum_{i \in S(j)} \phi_m(z_{i,j} - f(x_i^j, y_j^{(k)})) + \qquad (9)$$
$$r_i^{j(k)T}(x_i^j - x_i^{(k)}) + (\rho/2)\phi_a(x_i^j - x_i^{(k)})$$

$$x_i^{(k+1)} := \underset{x_i}{\operatorname{argmin}} \sum_{j:i \in S(j)} r_i^{j(k)T}(x_i^{j(k+1)} - x_i) + (\rho/2)\phi_a(x_i^{j(k+1)} - x_i) \qquad (10)$$

$$r_i^{j(k+1)} := r_i^{j(k)} + \rho(x_i^{j(k+1)} - x_i^{(k+1)}) \qquad (11)$$

$$y_j^{(k+1)} := \underset{y_j}{\operatorname{argmin}} \sum_{i \in S(j)} \phi_m(z_{i,j} - f(x_i^{j(k+1)}, y_j)) \qquad (12)$$

Here, k represents the iteration number. The solutions for the distributed points can be obtained by solving Equation (9) for all $j \in \{1, \ldots, m\}$, and it can be easily distributed across multiple processes or processing nodes. At the update of all $x_i^j$, the consensus estimates for all $x_i$ can be obtained by solving Equation (10) for $j=\{1, \ldots, m\}$, and the Lagrangian multiplier can be updated by solving Equation (11) for each of n scene points.

If $\phi_m$ is squared $l_2$ distance, Equation (9) can be solved using the Gauss-Newton method, where $f$ is repeatedly linearized around the current solution to solve a least squares subproblem for δx, using a line search to update x. If $\phi_m$ is Huber loss, Limited Memory BFGS (L-BFGS) may be used to update the distributed scene points. If $\phi_a$ is squared $l_2$ distance, Equation (10) simplifies to $$x_i^{(k+1)} := \frac{1}{|j:i \in S(j)|} \sum_{j:i \in S(j)} (x_i^{j(k+1)} + (1/\rho)r_i^{j(k)}). \qquad (13)$$

Next, we will discuss the formulations for configuration 506 or, more generally, the formulations for distributing camera parameters only. In these formulations, it is assumed that each world or scene point is imaged by a separate camera, and pose a constraint for the equivalence of cameras. Equation (2) can thus be re-written as $$\min_{\{y_j^i\},\{x_i\},\{y_j\}} \sum_{j=1}^m \sum_{i \in S(j)} \phi_m(z_{i,j} - f(x_i, y_j^i)) \text{ such that } y_j^i = y_j, \qquad (14)$$

$$\forall \, j, \text{ and } \{i \in S(j)\}$$

The augmented Lagrangian in this case is $$\sum_{j=1}^m \sum_{i \in S(j)} \phi_m(z_{i,j} - f(x_i, y_j^i)) + r_i^{jT}(y_j^i - y_j) + (\rho/2)\phi_a(y_j^i - y_j). \qquad (15)$$

The Equation (14) may be minimized in an iterative manner using ADMM as follows:

$$y_j^{i(k+1)} := \underset{\{y_j^i\}}{\mathrm{argmin}} \sum_{j:i\in S(j)} \phi_m(z_{i,j} - f(x_i^{(k)}, y_j^{i(k)})) + \tag{16}$$

$$r_j^{i(k)T}(y_j^i - y_j^{(k)}) + (\rho/2)\phi_a(y_j^i - y_j^{i(k)})_2^2$$

$$y_j^{(k+1)} := \underset{y_j}{\mathrm{argmin}} \sum_{i\in S(j)} r_j^{i(k)T}(y_j^{i(k)} - y_j) + (\rho/2)\phi_a(y_j^{i(k+1)} - y_j)_2^2 \tag{17}$$

$$r_j^{i(k+1)} := r_j^{i(k)} + \rho(y_j^{i(k+1)} - y_j^{(k+1)}) \tag{18}$$

$$x_i^{(k+1)} : \underset{x_i}{\mathrm{argmin}} \sum_{j:i\in S(j)} \|z_{i,j} - f(x_i, y_j^{i(k+1)})\|_2^2 \tag{19}$$

The solution for this iterative optimization can be obtained in a manner similar to that described above with respect to the distributed scene point estimation procedure.

We will now discuss the formulations for configuration 508 or, more generally, the formulations for distributing both scene points and camera parameters. In these formulations, the camera point and scene point corresponding to each image point is estimated independently, and then appropriate equality constraints are imposed. In this case, Equation (2) can be written as $$\underset{\{x_i^j\},\{y_j^i\},\{x_i\},\{y_j\}}{\mathrm{min}} \sum_{j=1}^m \sum_{i\in S(j)} \phi_m(z_{i,j} - f(x_i^j, y_j^i)), \text{ such that } x_i^j = x_i, \tag{20}$$

$$\forall\, i, \text{ and } \{j:i \in S(j)\},\ y_j^i = y_j,\ \forall\, j, \text{ and } \{i \in S(j)\}.$$

The augmented Lagrangian in this case, where $r_i^j$ and $s_j^i$ are the Lagrange multipliers, is $$\sum_{j=1}^m \sum_{i\in S(j)} \phi_m(z_{i,j} - f(x_i^j, y_j^i)) + r_i^{jT}(x_i^j - x_i) + \tag{21}$$

$$s_j^{iT}(y_j^i - y_j) + (\rho_x/2)\phi_a(x_i^j - x_i) + (\rho_y/2)\phi_a(y_j^i - y_j)$$

The Equation (21) can be minimized in an iterative manner as follows:

$$(x_i^{j(k+1)}, y_j^{i(k+1)}) := \underset{\{x_i^j\},\{y_j^i\}}{\mathrm{argmin}} \phi_m(z_{i,j} - f(x_i^j, y_j^i)) + r_i^{j(k)T}(x_i^j - x_i^{(k)}) + \tag{22}$$

$$s_j^{i(k)T}(y_j^i - y_j^{(k)}) + (\rho_x/2)\phi_a(x_i^j - x_i^{(k)}) + (\rho_y/2)\phi_a(y_j^i - y_j^{(k)}),$$

$$x_i^{(k+1)} := \underset{x_i}{\mathrm{argmin}} \sum_{j:i\in S(j)} r_i^{j(k)T}(x_i^{j(k+1)} - x_i) + (\rho_x/2)\phi_a(x_i^{j(k+1)} - x_i), \tag{23}$$

$$y_j^{(k+1)} := \underset{y_j}{\mathrm{argmin}} \sum_{i\in S(j)} r_j^{i(k)T}(y_j^{i(k)} - y_j) + (\rho_y/2)\phi_a(y_j^{i(k+1)} - y_j), \tag{24}$$

$$r_i^{j(k+1)} := r_i^{j(k)} + \rho(x_i^{j(k+1)} - x_i^{(k+1)}), \tag{25}$$

$$s_j^{i(k+1)} := s_j^{i(k)} + \rho_y(y_j^{i(k+1)} - y_j^{(k+1)}). \tag{26}$$

The Equation (22) has to be solved for all $j\in S(i)$, $i\in\{1,\ldots,m\}$, and it can be trivially distributed across multiple processes or processing nodes. If $\phi_m$ is squared $l_2$ distance, Equation (22) can be solved using the Gauss-Newton method, where $f$ is repeatedly linearized around the current solution to solve a least squares subproblem for $(\delta_x,\delta_y)$, using a line search to update $(x,y)$. If $\phi_m$ is Huber loss, L-BFGS may be used to update distributed scene points. If $\phi_a$ is squared $l_2$ distance, Equation (23) simplifies to $$x_i^{(k+1)} := \frac{1}{|j:i\in S(j)|} \sum_{j:i\in S(j)} (x_i^{j(k+1)} + (1/\rho_x)r_i^{j(k)}). \tag{27}$$

Upon convergence, the consensus estimates $x_i$ and $y_j$ for all scene points and cameras are obtained.

The time complexity of this approach of optimizing Equation (22) is O(l) for each round of updates. Note that each round of updates (for a single k value) consists of optimizing Equation (22) l times, with a fixed time complexity in every step. The time complexity of the consensus steps for camera parameters and world points given by Equations (23) and (24) are O(m) and O(n) respectively. For the Lagrangian parameter updates given by Equations (25) and (26), the time complexity is O(l). Hence the dominant time complexity of the proposed algorithm is O(l) for each round. Since the algorithm can be trivially parallelized, the complexity can be brought down to O(l) for each round, if we distribute all the observations to individual processors, and perform the consensus also in a distributed manner.

The above approach is elegant, but Equation (22) could become ill-conditioned sometimes even if we set $\rho_x$ and $\rho_y$ to high values, since we are trying to estimate p+q>2 parameters from a single 2D observation. Therefore, in some embodiments the estimation is generalized to use more than one observation and hence more than one scene point during each update step. This results in a better-conditioned system and also provides flexibility to adjust the number of 3D scene points based on the computational capabilities of each processing nodes, such as each thread in a CPU or a GPU. This generalized estimation step can be written as, $$(X_i^{j(k+1)}, y_j^{i(k+1)}) := \underset{\{x_i^j\},\{y_j^i\}}{\mathrm{argmin}} \phi_m(Z_{i,j} - f(X_i^j, y_j^i)) + r_i^{j(k)T}(X_i^j - X_i^{(k)}) + \tag{28}$$

$$s_j^{i(k)T}(y_j^i - y_j^{(k)}) + (\rho_x/2)\phi_a(X_i^j - X_i^{(k)}) + (\rho_y/2)\phi_a(y_j^i - y_j^{(k)}),$$

$$X_i^{j(k+1)} := [x_{i_1}^{j(k)} x_{i_2}^{j(k)} \ldots x_{i_\pi}^{j(k)}]^{-T} \tag{29}$$

The $\pi$ scene points in the matrix $X_i^{j(k+1)}$ can be selected randomly or by some predetermined criteria, but need to be observable by the cameras $y_j^{(k)}$.

Several experiments were conducted with synthetic and real data to illustrate convergence of the re-projection error and the parameter estimates. The experiments and results discussed below are based on distributing scene points and camera parameters. The results obtained are also compared with a centralized BA algorithm using LM. The LM was designed to stop when the norm of the re-projection error dropped below $10^{-14}$, or when the regularization parameter becomes greater than $10^{16}$.

Instead of generating fully random camera poses and tie points in the synthetic data, the experiments simulate a credible scenario with smooth camera pose transition and noise parameters consistent with the range of measurement error that would be observed with sensors in a real-world case. In addition to allowing for evaluation of the error in the estimated 3D scene point cloud and the camera parameters, which is often hard if not impossible in a real case, this also allows for predicting how a particular error of estimate in the camera pose reflects on the final tie points triangulation.

Figure 6:
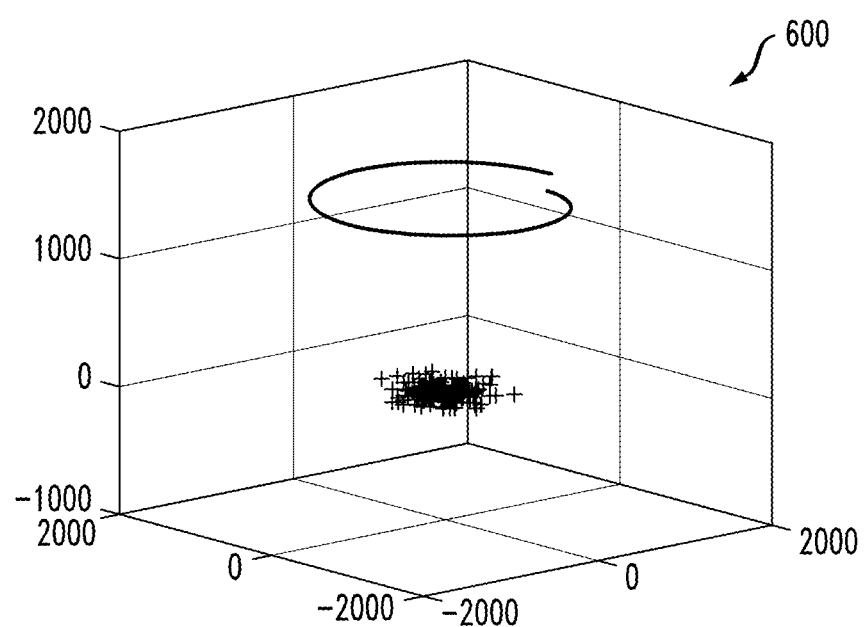
FIG. 6 is a plot depicting scene points and a camera flight path, according to an embodiment of the present invention.

In the simulated scenario, which is illustrated by plot 600 in FIG. 6, the camera positions are sampled all around an average orbit, with an average radius (1000 m) and altitude (1500 m), and the camera is at first directed towards a predetermined area. To each camera pose, a random translation and rotation is added as any real observer cannot move in a perfect circle while steadily aiming always in the same exact direction. The camera path and the 3D scene points for the simulated scenario are shown in the plot 600. In a real-world scenario, the tie points are usually visible only within a small subset of the available views, and it is generally not practical to try to match all key points within each possible pair of frames. Instead it is a more reasonable approach to track and try to match points within adjacent frames. To account for these conditions in the synthetic data, artificial occlusions or misdetections are created so that each point is only visible on a few consecutive frames.

Reprojection error and parameter convergence were evaluated for the proposed algorithms distributing scene points and camera parameters for four combination of the loss functions $\phi_m$ and $\phi_a$. The number of cameras is 5, the number of scene points is 10, and the number of 2D image points or observations is 50. The standard deviation for the additive Gaussian noise during the initialization of the camera angles and positions is fixed at 0.1. The standard deviation of noise for the scene points is varied from 0.2 to 1.7. As noted above, introducing robust losses for the misfit penalty helps the convergence of the re-projection error significantly as seen from FIGS. 7-9, while choosing a robust augmentation loss hinders the convergence. The performance degrades gracefully with noise for the converging cases. When the Huber loss is used with the augmentation term, the objective evolution could be spiky whereas the parameter evolution is smooth.

Figure 7:
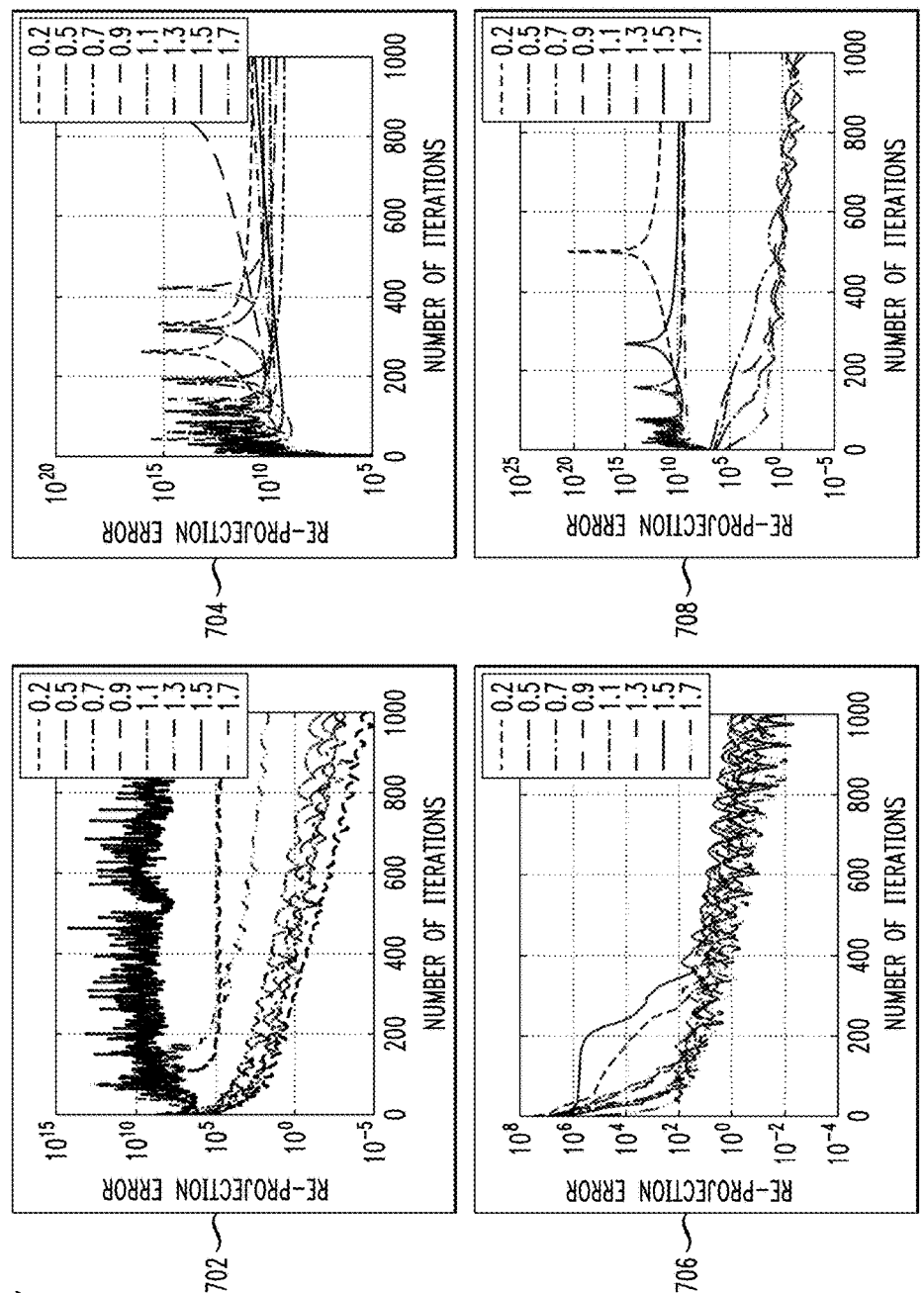
FIG. 7 shows plots illustrating the convergence of re-projection error, according to an embodiment of the present invention.

FIG. 7 shows plots to illustrate the convergence of the re-projection error for the misfit ($\phi_m$) and augmentation ($\phi_a$) losses. Plot 702 shows $\phi_m$-squared $l_2$, $\phi_a$-squared $l_2$, plot 704 shows $\phi_m$-squared $l_2$, $\phi_a$-Huber, plot 706 shows $\phi_m$-Huber, $\phi_a$-squared $l_2$ and plot 708 shows $\phi_m$-Huber, $\phi_a$-Huber. Similar behavior is observed with the convergence of scene points, illustrated by the plots in FIG. 8, and the convergence of camera parameters, illustrated by the plots in FIG. 9.

Figure 8:
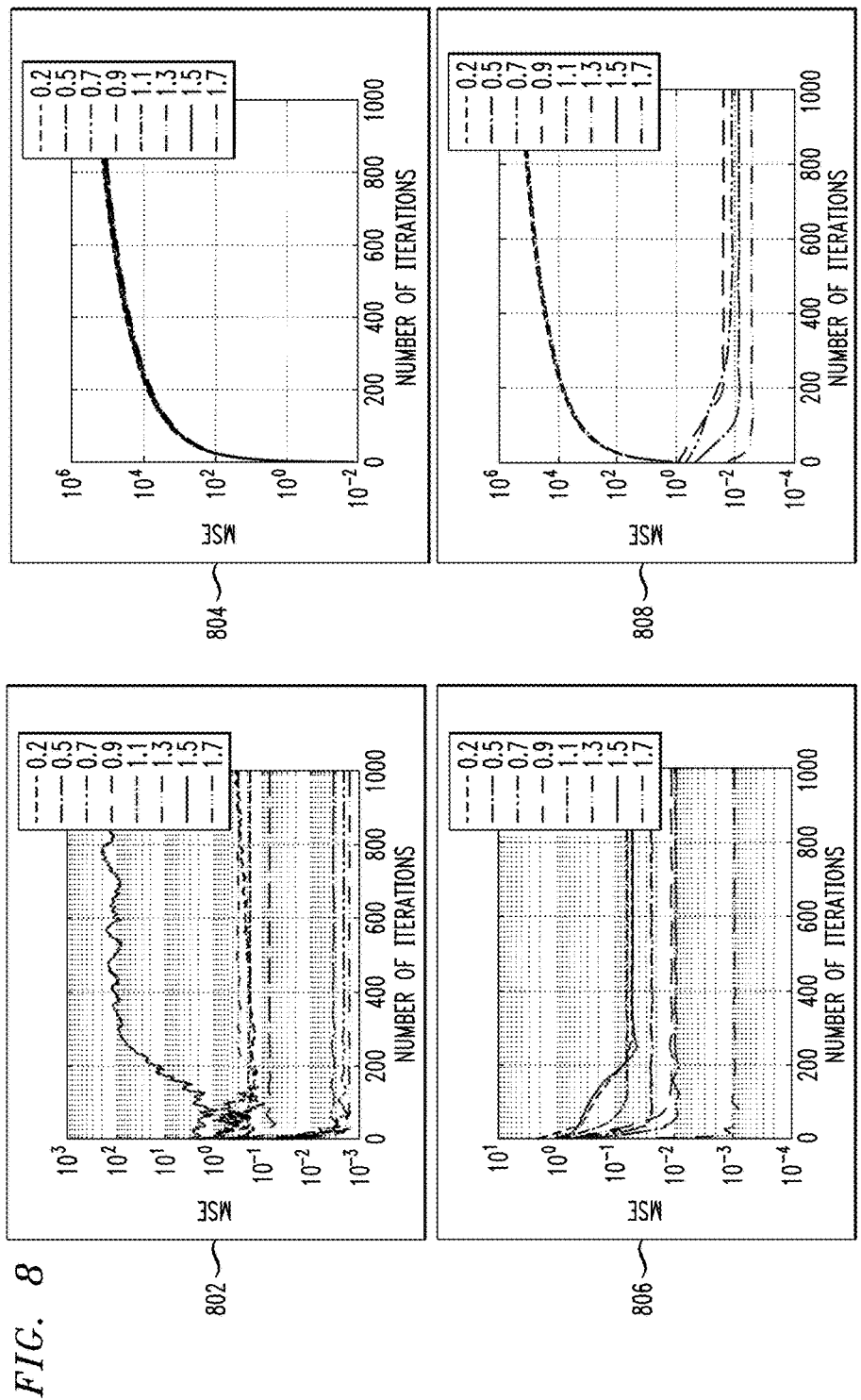
FIG. 8 shows plots illustrating the convergence of error for estimated scene points, according to an embodiment of the present invention.

FIG. 8 shows plots to illustrate the convergence of the mean-squared error between the actual and estimated scene points for the misfit ($\phi_m$) and augmentation ($\phi_a$) losses. Plot 802 shows $\phi_m$-squared $l_2$, $\phi_a$-squared $l_2$, plot 804 shows $\phi_m$-squared $l_2$, $\phi_a$-Huber, plot 806 shows $\phi_m$-Huber, $\phi_a$-squared $l_2$ and plot 808 shows $\phi_m$-Huber, $\phi_a$-Huber.

Figure 9:
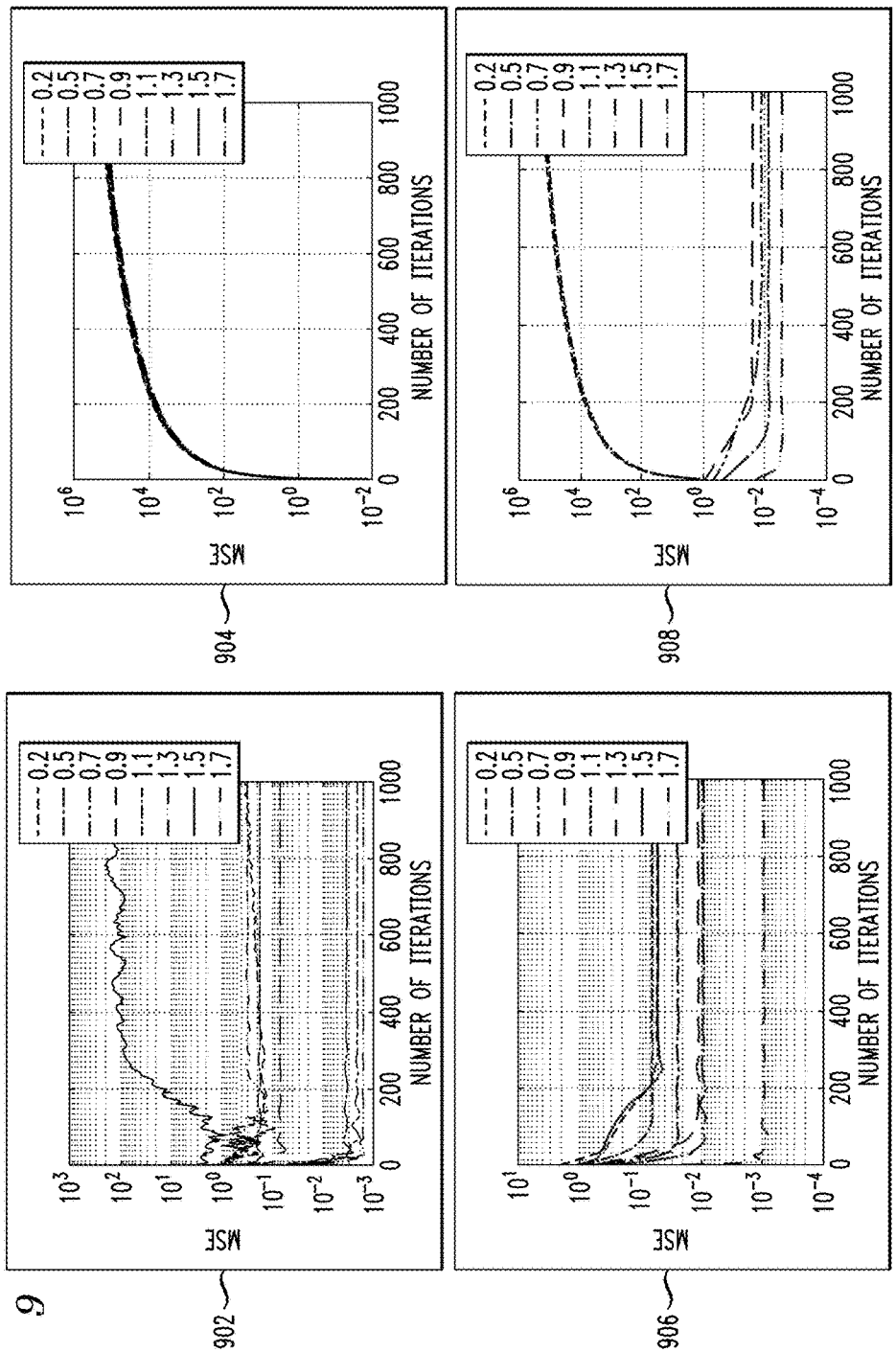
FIG. 9 shows plots illustrating the convergence of error for estimated camera parameter sets, according to an embodiment of the present invention.

FIG. 9 shows plots to illustrate the convergence of the mean-squared error between the actual and estimated camera parameters for the misfit ($\phi_m$) and augmentation ($\phi_a$) losses. Plot 902 shows $\phi_m$-squared $l_2$, $\phi_a$-squared $l_2$, plot 904 shows $\phi_m$-squared $l_2$, $\phi_a$-Huber, plot 906 shows $\phi_m$-Huber, $\phi_a$-squared $l_2$ and plot 908 shows $\phi_m$-Huber, $\phi_a$-Huber.

The approach distributing scene points and camera parameters and using ADMM is also compared to a centralized BA with LM, with the results presented in the plots 1002 and 1004 of FIG. 10. The number of camera parameters and 3D scene points are (10,40), (15,100), (25,100), (30,200), (100,200) and (100,250) for the increasing number of observations shown in the x-axis of plots 1002 and 1004. As shown in the plots 1002 and 1004, ADMM has a better mean-squared error (MSE) in recovering the parameters as compared to the centralized LM approach. The ploy 1002 shows the MSE between the actual and estimated camera parameters, while the ploy 1004 shows the MSE between the actual and estimated scene points.

The runtime of the approach distributing scene points and camera parameters and using ADMM is shown in plot 1006 of FIG. 10. The runtime is shown with respect to the number of observations and parallel workers in plot 1006. As illustrated in plot 1006, the runtime is linear with respect to the observations and reduces with increasing workers. In this particular experiment, the parallel workers were configured in MATLAB, but embodiments are not limited to using MATLAB for parallel workers or processing nodes. For example, in some embodiments a fully parallel implementation in a fast language such as C can realize improved performance relative to using MATLAB parallel workers.

Since there is no ground truth available with real data, dense reconstruction results are compared with final objective values. FIG. 11 shows a sample image 1102. After key point detection and matching, the centralized LM method and the D-ADMM algorithm distributing scene points and camera parameters are given the same input. In this example, there are 104 total world points and 252 observations. The final re-projection error of the centralized LM method is 0.93, while the final re-projection error using the D-ADMM algorithm distributing scene points and camera parameters is 0.67, for this sample data. The estimated scene points and camera parameters obtained using the centralized LM method and D-ADMM algorithm distributing scene points and camera parameters are also used to perform 3D dense reconstruction. FIG. 11 shows the dense reconstruction quality of the LM method in 1104, and the dense reconstruction quality of the D-ADMM algorithm distributing scene points and camera parameters in 1106. Plot 1108 in FIG. 11 shows the convergence of re-projection error for the D-ADMM algorithm distributing scene points and camera parameters.

Embodiments provide a number of advantages. Principled distribution algorithms for BA compare well to centralized approaches in terms of performance and also provide distinct advantages for scalability in large scale SfM applications. For example, embodiments can scale linearly in runtime with respect to the number of observations. Emerging applications for BA include event summarization involving videos from swarms of drones. These and other emerging applications are not adequately enable by piecemeal approaches to scaling bundle adjustment, due to lack of quality of performance or lack of tractability. Embodiments, such as those utilizing D-ADMM approaches, provide a distributed framework that can withstand the challenges of scalability and performance in terms of convergence, among other advantages.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
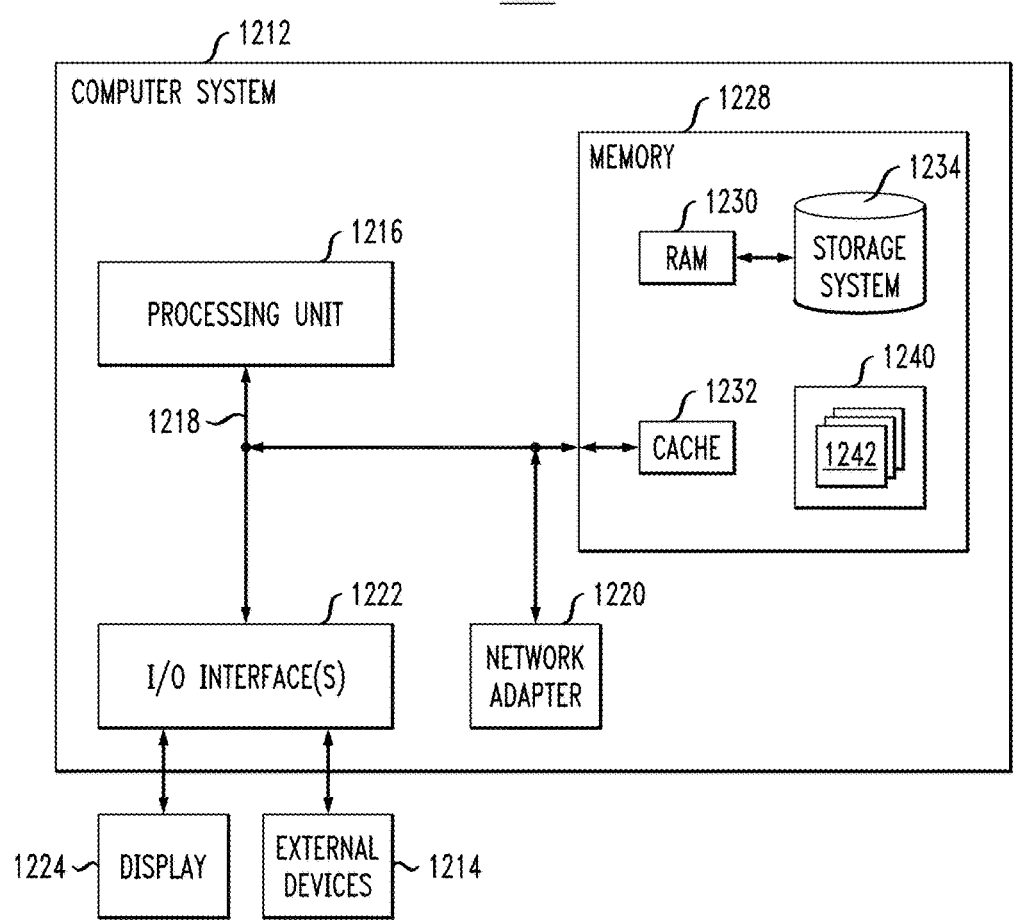
FIG. 12 depicts a computer system in accordance with which one or more components/steps of techniques of the invention may be implemented, according to an embodiment of the present invention.

One or more embodiments can make use of software running on a general-purpose computer or workstation. With reference to FIG. 12, in a computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

The bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1212 typically includes a variety of computer system readable media. Such media may be any available media that is accessible by computer system/server 1212, and it includes both volatile and non-volatile media, removable and non-removable media.

The system memory 1228 can include computer system readable media in the form of volatile memory, such as random access memory (RAM) 1230 and/or cache memory 1232. The computer system/server 1212 may further include other removable/non-removable, volatile/nonvolatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1218 by one or more data media interfaces. As depicted and described herein, the memory 1228 may include at least one program product having a set (e.g., at least one) of program modules that are configured to carry out the functions of embodiments of the invention. A program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc., one or more devices that enable a user to interact with computer system/server 1212, and/or any devices (e.g., network card, modem, etc.) that enable computer system/server 1212 to communicate with one or more other computing devices. Such communication can occur via I/O interfaces 1222. Still yet, computer system/server 1212 can communicate with one or more networks such as a LAN, a general WAN, and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
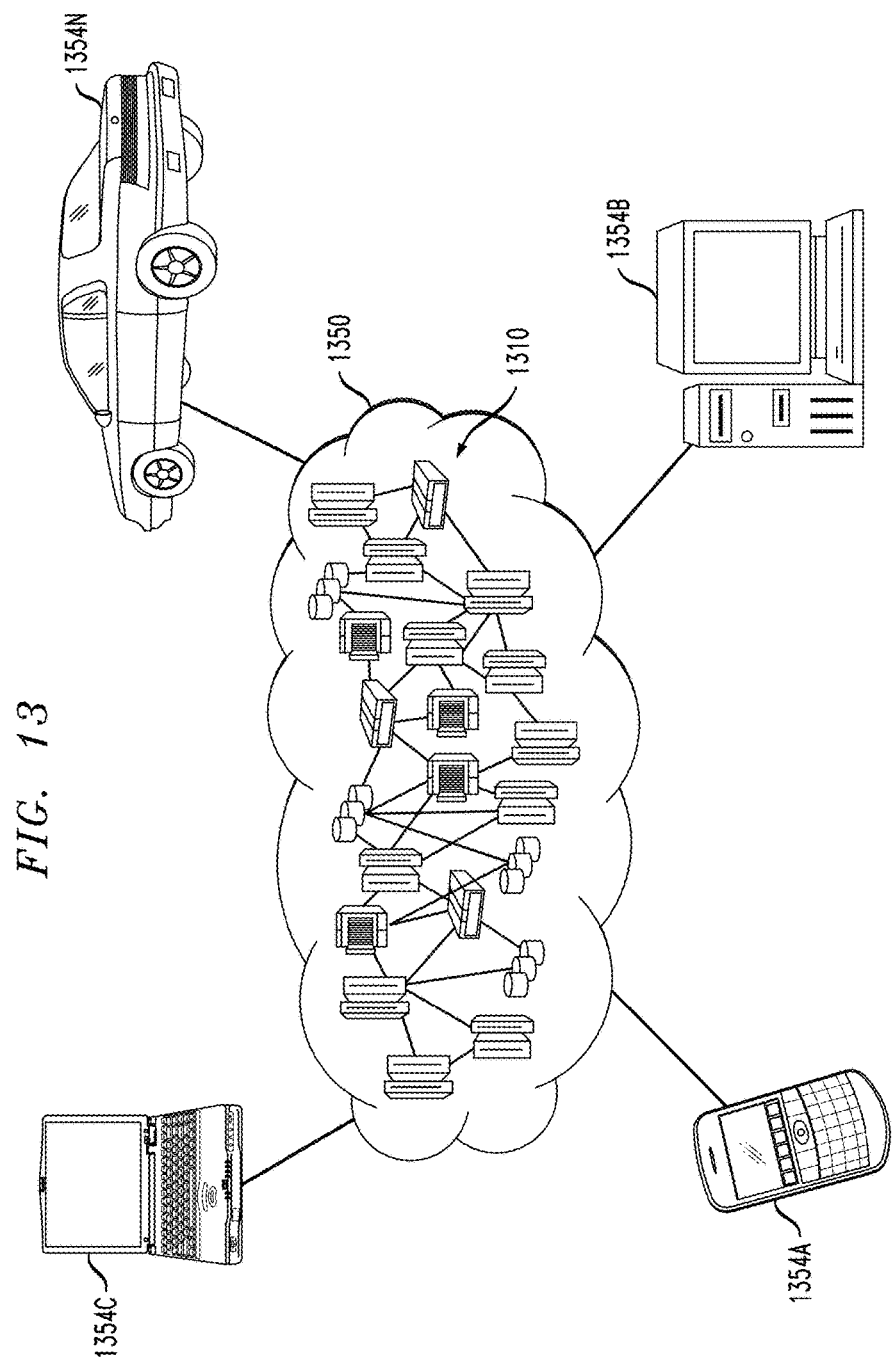
FIG. 13 depicts a cloud computing environment, according to an embodiment of the present invention.

Referring now to FIG. 13, illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1254N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
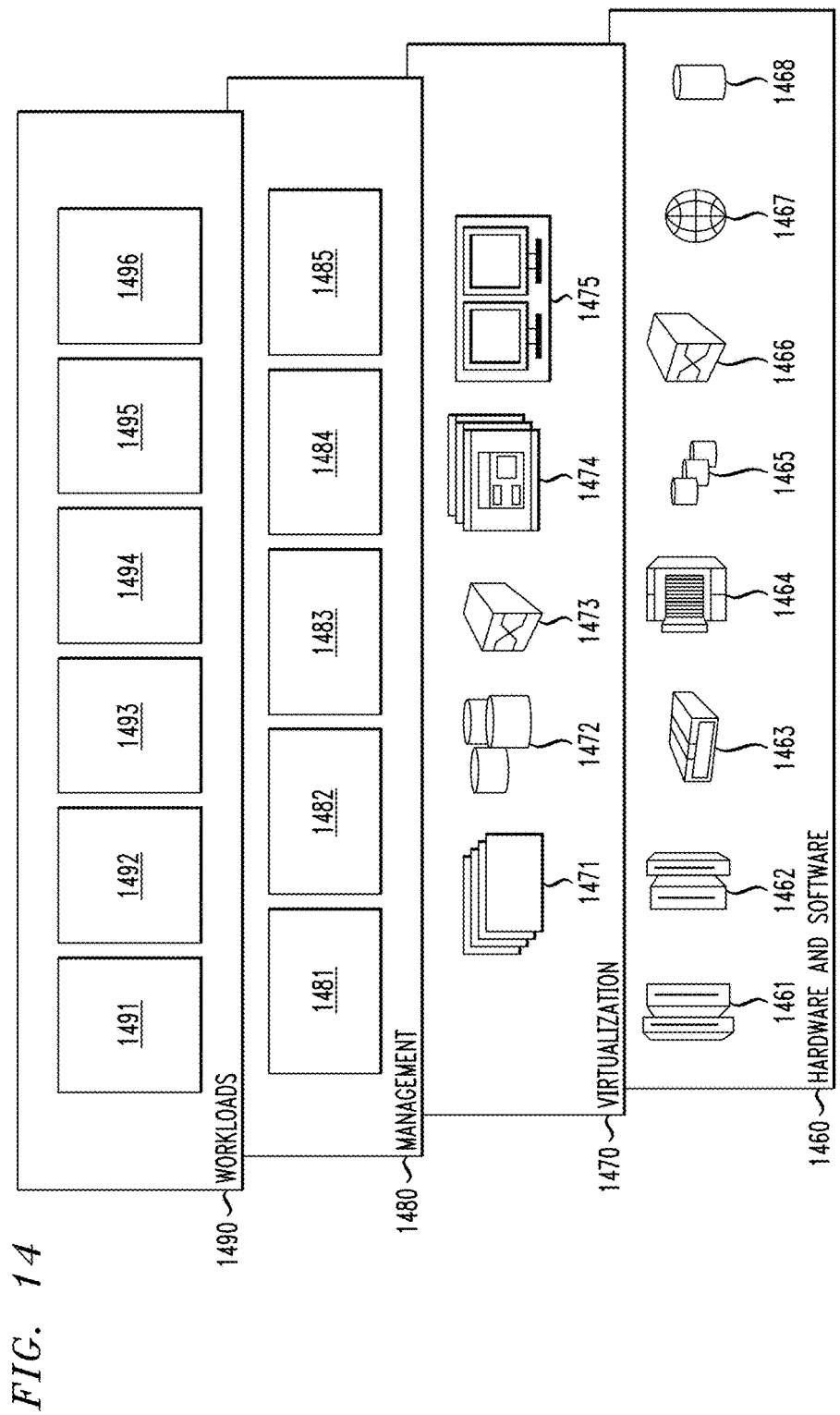
FIG. 14 depicts abstraction model layers, according to an embodiment of the present invention.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and three-dimensional reconstruction processing 1496, which may perform various functions described above with respect to producing three-dimensional reconstructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   obtaining two or more two-dimensional measurements of a given scene from one or more sensors, the given scene comprising a plurality of scene points;
   distributing the given scene into two or more bundles, each bundle being associated with at least one sensor and at least one scene point;

establishing constraints associated with one or more of the sensors and the plurality of scene points that are associated with two different bundles;

estimating, individually for each of the bundles, a set of parameters for the at least one sensor and the at least one scene point associated with that bundle utilizing at least one of the two-dimensional measurements;

generating a consensus parameter set for the one or more sensors and the plurality of scene points based on the estimated parameter sets, the established constraints being utilized to reconcile differences in parameter values in the estimated parameter sets for respective ones of the one or more sensors and the plurality of scene points; and producing a three-dimensional representation of the given scene utilizing the consensus parameter set;

wherein estimating the set of parameters and generating the consensus parameter set comprise utilizing an alternating direction method of multipliers algorithm;

wherein establishing constraints comprises:
  setting a first constraint such that, for any scene point associated with at least two different bundles, the parameter values for that scene point are substantially the same for the different bundles; and
  setting a second constraint such that, for any sensor associated with at least two different bundles, the parameter values for that sensor are substantially the same for the different bundles; and wherein the method is performed by at least one processing device comprising a processor coupled to a memory.

2. The method of claim 1, wherein at least one of the sensors comprises an image capture device.

3. The method of claim 1, wherein at least one of the sensors comprises a drone.

4. The method of claim 1, wherein at least two of the two-dimensional measurements of the given scene are obtained from a single one of the sensors.

5. The method of claim 1, wherein a first one of the two-dimensional measurements of the given scene is obtained from a first sensor and a second one of the two-dimensional measurements of the given scene is obtained from a second sensor different than the first sensor.

6. The method of claim 1, wherein distributing the given scene into the two or more bundles comprises distributing a given scene point such that the given scene point is associated with a first bundle and at least a second bundle.

7. The method of claim 1, wherein distributing the given scene into the two or more bundles comprises distributing a given sensor such that the given sensor is associated with a first bundle and at least a second bundle.

8. The method of claim 1, wherein distributing the given scene into the two or more bundles comprises distributing the plurality of scene points such each of the bundles is associated with a single one of the plurality of scene points.

9. The method of claim 1, wherein distributing the given scene into the two or more bundles comprises distributing the one or more sensors such that each of the bundles is associated with a single one of the one or more sensors.

10. The method of claim 1, wherein distributing the given scene into the two or more bundles comprises distributing the one or more sensors and the plurality of scene points such that each bundle is associated with a single one of the one or more sensors and a single one of the plurality of scene points.

11. The method of claim 1, wherein parameters of a given sensor comprise:
  a three-dimensional position; and
  roll, pitch and yaw angles.

12. The method of claim 11, wherein the parameters of a given sensor further comprise:
  a principal point;
  focal length;
  focal length ratios; and
  axis skew.

13. The method of claim 1, wherein parameters of a given scene point comprise a three-dimensional position.

14. The method of claim 1, wherein estimating the parameter sets comprises:
  providing the two or more bundles to two or more processing nodes; and
  receiving, from the two or more processing nodes, the estimated parameter sets.

15. The method of claim 14, wherein:
  at least one of the sensors comprises at least one of the processing nodes; and
  the processing nodes are distinct from the sensors.

16. The method of claim 1, wherein utilizing the alternating direction method of multipliers algorithm comprises, for each of the bundles, performing a plurality of iterations of minimizing an objective function, the plurality of iterations alternating between updating: Lagrangian multipliers for the established constraints; the estimated parameter sets; and the consensus parameter set.

17. An apparatus comprising:
  a processing device comprising a processor coupled to a memory;
  the processing device being configured:
    to obtain two or more two-dimensional measurements of a given scene from one or more sensors, the given scene comprising a plurality of scene points;
    to distribute the given scene into two or more bundles, each bundle being associated with at least one sensor and at least one scene point;
    to establish constraints associated with one or more of the sensors and the plurality of scene points that are associated with two different bundles;
    to estimate, individually for each of the bundles, a set of parameters for the at least one sensor and the at least one scene point associated with that bundle utilizing at least one of the two-dimensional measurements;
    to generate a consensus parameter set for the one or more sensors and the plurality of scene points based on the estimated parameter sets, the established constraints being utilized to reconcile differences in parameter values in the estimated parameter sets for respective ones of the one or more sensors and the plurality of scene points; and
    to produce a three-dimensional representation of the given scene utilizing the consensus parameter set;
  wherein the processing device is configured to estimate the set of parameters and generate the consensus parameter set utilizing an alternating direction method of multipliers algorithm; and
  wherein establishing constraints comprises:
    setting a first constraint such that, for any scene point associated with at least two different bundles, the parameter values for that scene point are substantially the same for the different bundles; and
    setting a second constraint such that, for any sensor associated with at least two different bundles, the parameter values for that sensor are substantially the same for the different bundles.

18. The apparatus of claim 17, wherein utilizing the alternating direction method of multipliers algorithm comprises, for each of the bundles, performing a plurality of iterations of minimizing an objective function, the plurality of iterations alternating between updating: Lagrangian multipliers for the established constraints; the estimated parameter sets; and the consensus parameter set.

19. A computer program product comprising a computer readable storage medium for storing computer readable program code which, when executed, causes a computer:
- to obtain two or more two-dimensional measurements of a given scene from one or more sensors, the given scene comprising a plurality of scene points;
- to distribute the given scene into two or more bundles, each bundle being associated with at least one sensor and at least one scene point;
- to establish constraints associated with one or more of the sensors and the plurality of scene points that are associated with two different bundles;
- to estimate, individually for each of the bundles, a set of parameters for the at least one sensor and the at least one scene point associated with that bundle utilizing at least one of the two-dimensional measurements;
- to generate a consensus parameter set for the one or more sensors and the plurality of scene points based on the estimated parameter sets, the established constraints being utilized to reconcile differences in parameter values in the estimated parameter sets for respective ones of the one or more sensors and the plurality of scene points; and
- to produce a three-dimensional representation of the given scene utilizing the consensus parameter set;

wherein estimating the set of parameters and generating the consensus parameter set comprise utilizing an alternating direction method of multipliers algorithm; and wherein establishing constraints comprises:
- setting a first constraint such that, for any scene point associated with at least two different bundles, the parameter values for that scene point are substantially the same for the different bundles; and
- setting a second constraint such that, for any sensor associated with at least two different bundles, the parameter values for that sensor are substantially the same for the different bundles.

20. The computer program product of claim 19, wherein utilizing the alternating direction method of multipliers algorithm comprises, for each of the bundles, performing a plurality of iterations of minimizing an objective function, the plurality of iterations alternating between updating: Lagrangian multipliers for the established constraints; the estimated parameter sets; and the consensus parameter set.

* * * * *